Patented May 20, 1952

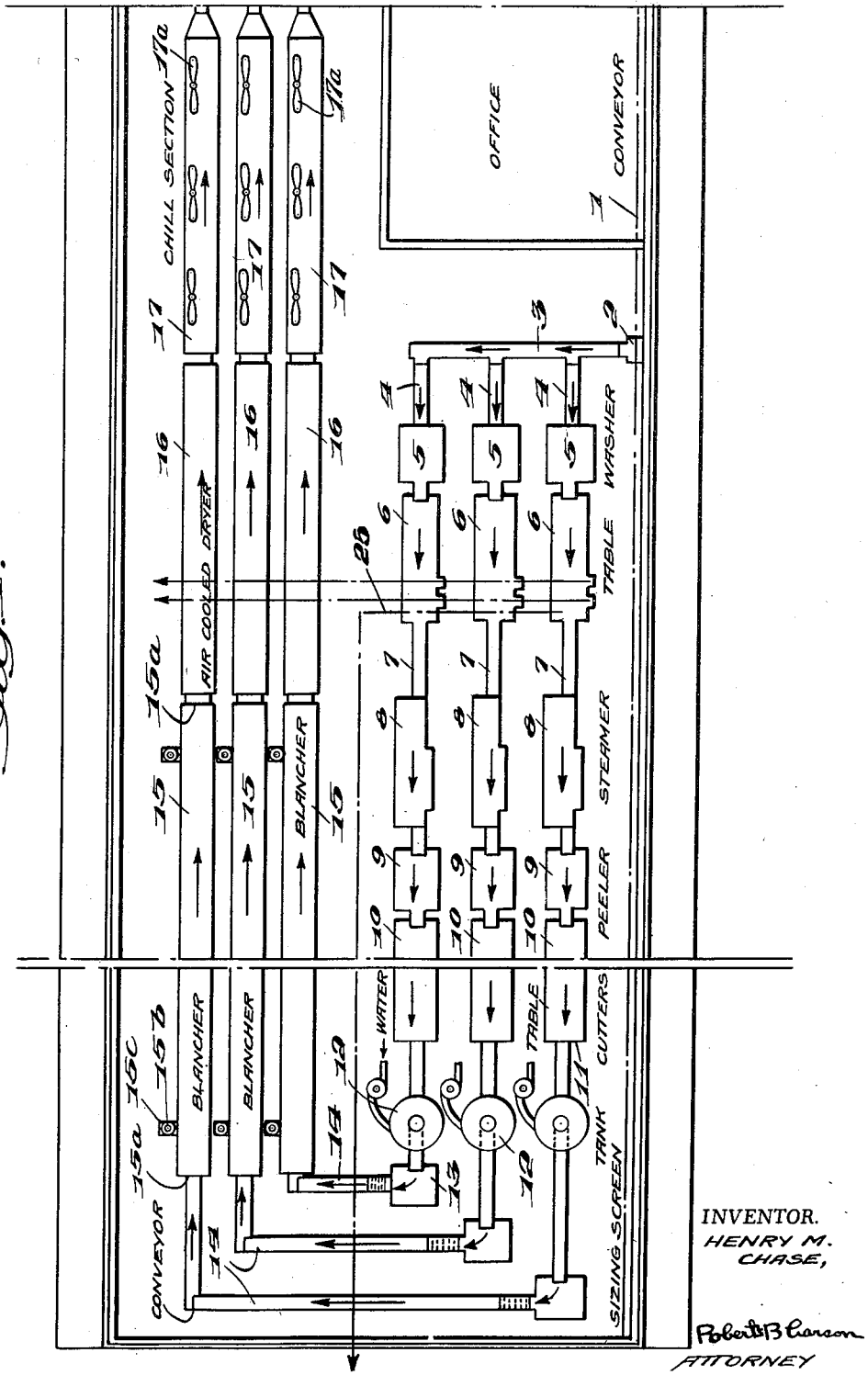

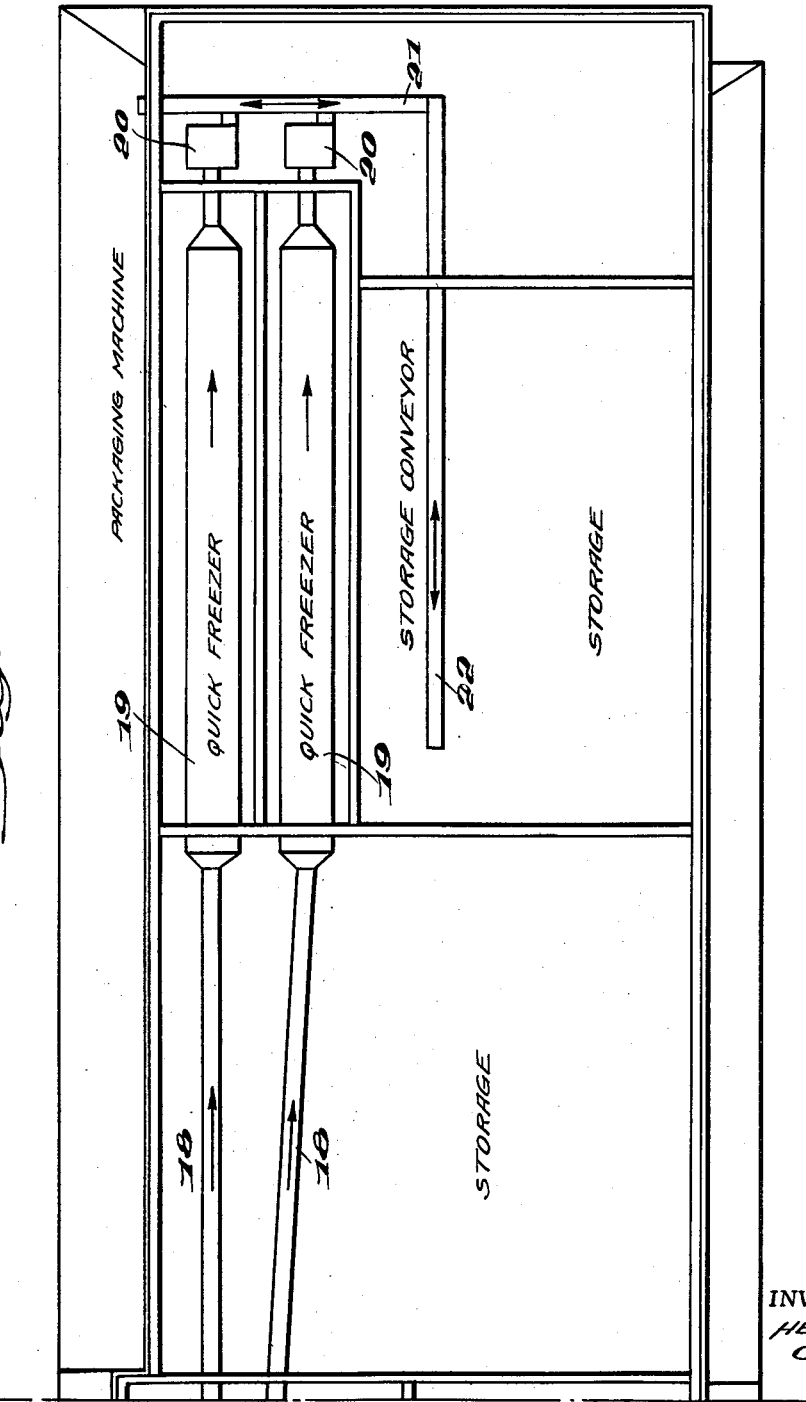

2,597,066

UNITED STATES PATENT OFFICE 2,597,066

PROCESS FOR PREPARING AND PRESERVING FROZEN POTATOES

Henry M. Chase, Nampa, Idaho, assignor to Arthur M. Chase, Nampa, Idaho

Application September 13, 1949, Serial No. 115,498

3 Claims. (Cl. 99—193)

This invention is an improvement of the invention described in my co-pending application Serial No. 96,421, filed June 1, 1949, and relating to the treatment and preparation of potatoes.

In the above mentioned application I described a series of processing steps including washing, peeling, cutting, blanching, drying, freezing and packaging potatoes in different types of cuts, for example, "French fries," "Shoe strings," "Hash browns," and others. The process there described provided a frozen product which could be cooked without preliminary thawing, and which, after cooking, is preferable in many respects to fresh potatoes similarly cooked.

I have found that the process described in my above mentioned application can be improved by the inclusion of a washing step which is carried out on the freshly cut or sliced potatoes. This new step comprises removal of the outside starch of the potato by washing in rapidly agitated fresh water. As a result, the potatoes do not stick together and separate more easily. This step replaces the treatment of the potatoes in a solution of sodium bisulfite as described in my earlier filed application.

The present invention also includes a further novel feature of the provsion of blanchers which are practically steam tight with heavy drop curtains at each end and a pressure valve controlling a steam escape stack. The result is the building up of proper, even heat without actually building up steam pressure.

I have also found that the air coolers or dryers described in my co-pending application should preferably be used not only to remove all surface moisture from the cut potatoes, but also partly to dehydrate the potatoes to a point where they contain 10–15% less moisture than the freshly cut, untreated potatoes.

Another new feature is the provision in the chill sections of a succession of high speed circulating air fans to assist in drying as well as cooling the potatoes.

Still another new feature is the conditioning of the potatoes, prior to processing, in order to convert excess sugar to starch. Sugar in excess of 1% by weight renders a potato unfit for deep frying and adversely affects it with regard to other types of cooking. At the time of harvesting, most late varieties of potato have a sugar content of less than 1%, but when stored in cool storage, enough starch is converted to sugar to necessitate reconversion to render the potato desirable for processing and subsequent cooking. I condition the potatoes to convert excess sugar to starch by storing at a temperature of 70°–80° F. for 10–20 days, depending upon the sugar content of the particular lot.

This invention has for its principal objects the provision of the various new steps and features pointed out above with the overall aim of preparing frozen potatoes which are commercially successful to a far greater degree than those prepared according to known processes prior to this and my co-pending application mentioned above.

These and other objects and advantages of the invention will be more apparent from the following specification when read in connection with the accompanying drawing, in which:

Figs. 1 and 1A show diagrammatically a processing plant for carrying out the invention.

In many instances it is advisable as a preliminary step to processing as will be described, to store the fresh potatoes in conditioning rooms or the like where the temperature can be regulated for heat and cold. As the potatoes are placed in such rooms, they are tested for sugar content so that it can be ascertained how long it will be necessary to store the potatoes in a warm room (for example at 70–85° F.) in order to change the excess sugar to starch and to render the potatoes in proper condition for the process which will now be described. If the potatoes contain 3% sugar 17–18 days of storage at 70° F. or 14–15 days at 80°–85° F. will be desirable. The 70° F. storage is preferred as sprouting does not start as quickly.

After such preliminary conditioning mentioned, the potatoes are conveyed into the processing plant shown in the drawings by means of a belt line conveyor indicated by the reference numeral 1. This belt line conveyor 1 delivers the potatoes to the elevator 2 which elevates them to a master distributing conveyor 3. The conveyor 3 in turn feeds three processing lines through the medium of short belt line conveyors 4, which in the first instance convey the potatoes to washers indicated by the reference numeral 5.

Each washer 5 is a cleaning apparatus which is provided with revolving fiber brushes. The potatoes are also subjected here to a heavy cold water spray with a pressure of about 80 pounds. The potatoes are thus cleaned by the revolving fiber brushes under the heavy water spray in this washer 5 and are then dropped onto sorting tables 6 where all waste is picked out. Then, advantageously, several sizes of hand-picked baker potatoes are placed on side delivery belts (shown in dotted lines and indicated by the reference numeral 25) to be carried or conveyed to cars or to the storage room. The rest of the potatoes then drop down to conveyors 7 by which they are transported to the steamers 8.

In the steamers 8, which may be in the form of drums, the potatoes are steamed for one-half to three-quarters minutes at a steam pressure of about 100 pounds. The steamers may be batch or continuous. There are several on the market. The time that the potatoes are in the steamers depends on their temperature at the time they enter the steamer. For example, if they are at 70° F. when they enter the steamers it is only necessary that they remain in the steamers one-half minute. If the temperature is a little colder they remain a little longer.

From the steamers 8 the potatoes are dropped into the washer-peeler indicated by the reference numeral 9. This washer-peeler 9 is preferably of a round type with revolving soft fiber brushes which are adapted to engage the thin outer skin of the potatoes. At the same time that the fiber brushes operate on the potatoes the potatoes are under a heavy ice-water spray. This ice-water spray processing which follows the steaming in the steamer 8 at 100 pound steam pressure, effects a sudden change in temperature and "shocks" the thin outer skin off the potatoes. Moreover, with the rolling action of this washer-peeler (which in the example shown is about 12 feet long), the potatoes rub against each other thereby exposing all outside skin to the fiber revolving brushes, until all of the thin outer skin is removed without disturbing any of the inner covering, thereby saving all of the nutritive content of the potato, or the vitamins. This is important since, it is understood most of the food value in potatoes, aside from the starch, is contained in the outer three-eighths of an inch. By this sudden shock method, and with the aid of the soft fiber brushes, the skin is removed without cooking into the potato as is the case in most known processing lines.

From the washer-peeler 9 the potatoes pass to the specking or clean-up tables 10 where operators manually trim all eyes and specks. Fresh water troughs on either side of the tables permit the operators to dip the potatoes therein so that when the potatoes leave this table they are entirely clean and ready to be cut into the various sizes and shapes.

From the tables 10 the potatoes are elevated to the strip cutters or slicing machines 11. These machines cut the potatoes into any desired shapes and sizes such as "French-fries," "Shoe-strings," "Cottage-fries," "O'Brien," "Boilers," and "Hash-browns" or other sizes. The cutting machines then drop the cut pieces of potatoes into the tanks 12, which contain fresh water, which is kept agitated by a fast moving pump. The action of the water with this high agitation washes away the outside starch so that the potatoes will separate and not stick together. The time required is 3-4 minutes. The cut potatoes tend to settle to the bottom of the tank and then pass out on a conveyor or belt to the sizing screens 13, which is a round barrel shaped machine with long narrow slits so spaced that the thin slices or strips are allowed to drop through onto a conveyor belt which carries the off sizes to the hash-brown cutters.

From the end of 13 the sizing screen the potatoes are elevated to a belt conveyor 14 which delivers the processed stock to the blanchers 15. In the processing plant illustrated diagrammatically, each of these blanchers 15 is about 72 feet long and is provided preferably with a stainless steel web belt or the like mounted on rollers which passes completely through the blancher and on through the adjacent air cooler-dryer or cooler-dehydrator 16, and chill section 17 and in the case of two of the three processing lines, then through the quick-freeze tunnels 19.

In the blanchers 15 there are a succession of live steam jets spaced along the line. The potatoes are exposed to the live steam for about three minutes, a little more or less, depending on the volume and the time required for the size being run. The temperature employed is from 210° to 250° F. The live steam has the effect of killing the enzymes and stopping oxidation.

These blanchers 15 are almost steam tight with heavy drop curtains 15a at each end and a pressure valve 15b in the steam escape stacks 15c, in order to maintain proper even heat without actually building up a steam pressure.

From the blanchers 15 the lines continue, as indicated, to the air cooler-dryer or air cooler-dehydrator 16. These air cooler-dryers are each provided with a series of many air fans running at high speeds, forcing direct air currents from many angles, so as to remove all surface moisture from the cut potatoes, and more, the action of these fans, partly dehydrates the potatoes to a point where they contain approximately 10 to 15% less moisture than when the potatoes are freshly cut. (Fresh potatoes contain about 78% water and 22% solids, mostly starch). These air cooler-dryers 16, in the embodiment shown diagrammatically are about 40 feet long.

From the air cooler-dryers 16 the lines, as indicated, continue through the chill sections 17, which are refrigerated in such manner that the temperature therein is maintained just a little about 0° F. This section 17 is also provided with a succession of high speed circulating air fans 17a to assist in drying as well as cooling the potatoes. The potatoes are cooled in these chill sections 17, to a temperature of about 35° to 38° F. by the time they reach the end of these sections 17.

If the potatoes are not to be quick-frozen, they are then ready to take off the line at this point, for packaging if they are to be used fresh, and may be stored in the storage room of the processing plant which is maintained at a temperature of about 35° F. In the drawing, the lowermost line is the line for potatoes which are not to be quick-frozen and which are to be stored as thus indicated. In case all of the potatoes are to be quick frozen, all of the lines may be diverted from the end of section 17 onto the conveying belt lines 18 to be conveyed to the freezing section 19 in order to be frozen.

The other two lines 18 continue through the storage room to the quick-freezing tunnels 19, where they are subjected to quick-freeze temperatures of an average of —25° F. The temperature at the intake is about —30° F., at the outlet, —20° F., all below zero. When they come out of the quick-freeze tunnels they are then conveyed to packaging machines 20, which package the frozen potatoes and from which they are then conveyed to a zero degree temperature storage room on the two-way belt conveyor. After the potatoes have been in the zero storage room for a few hours, they are ready to leave on cars via the two-way belt line conveyor 21 and 22.

I have found that potatoes so treated will keep for many months without any change in condition when stored at zero temperature.

A portion of the processing and preserving method referred to can be employed also for producing a "Hash-brown" package which contains individual cakes or patties, after the potatoes have passed through the blanching and partial drying in the cooler-dryers 16, they are shredded and mixed very gently, with a very small amount of white wheat or potato flour, water and salt, in a barrel type of mixer which creates a tumbling action, which mixes the ingredients mentioned, and only enough water is added to make the small shredded pieces slightly adhere together so they will mold. Then they are transferred to the molding machine, which molds them into patties about 3½" across and about ⅝" thick, the molding is done very gently as the potatoes must not be pressed together very solid, but left as loose as possible and still form uniform patties. After molding they are placed on the conveyor and run through the quick-freeze tunnels 19 and when they come off the freezing line they are ready to package as desired.

So that my reference to the various potato cuts shall be clear to others, I shall describe them briefly, the dimensions given being approximate.

"French fries" are cut in strips about 3 to 7 inches long, in preferably two sized ⅜ inch square and ½ inch square.

"Shoestrings or julienne" are cut in strips about 3 to 7 inches long, and ¼ inch square.

"Cottage or American fries" are cut in slices cross-ways of the potato, ⅛ or ¼ inch thick, the slices being from 1 to 3 inches wide, depending on the size of the potato, may be cooked in deep fat or pan fried. These can be seasoned as if fresh to make delicious cheesed or scalloped potatoes.

"Hash-brown patties," as stated, are moulded from potatoes that have been shredded into very small pieces mostly ¼ to 1 inch long and from feather edge to ⅜ inch through the pieces; this enables the manufacturer to use all the small sizes screened out of the other cuts as well as all the small and otherwise unusable pieces, thereby making a great saving of potatoes that would be wasted. They may be molded as stated above or into any size pattie desired.

"Diced or O'Brien potatoes" are cut into squares ⅜ inch each way, ½ inch each way, ⅝ inch each way, or may be diced in any desired size.

"Boiling potatoes" are cut into strips and small pieces not over one inch thick and full length of the potato; these sizes are necessary in order that the heat from the steam in the blanchers may penetrate through the potato.

When cooking the various cuts, in deep fat, such as "French fries," "Shoestrings," and "Cottage fries," the fat should be preferably at 375° F. The French fries will cook done in about 3 minutes, the shoestrings and cottage fries in 2 to 2½ minutes, all these cuts are placed in the basket direct from the freezer and lowered into the hot fat, without thawing. They will come out a fine golden brown and be and stay much crisper longer than fresh potatoes, besides requiring less than half the time to cook.

When cooking the "Hash brown patties" they should be taken out of the freezer 10 to 15 minutes before frying, then place in the frying pan with a little fat and fry on a fairly slow heat; when they are brown turn once and brown on the other side, and they will be done through and thawed at the same time. Add salt and pepper to taste and serve.

When cooking "Cottage fries" they may be cooked in deep fat as explained above or fried in a frying pan the same as fresh potatoes, only they do not take nearly as long to cook done as the fresh.

When cooking "Diced or O'Brien potatoes," they are preferably placed in a frying pan with a little fat on a medium heat, and after thawing a little water may be added and a cover placed on the frying pan to hold in the steam and by stirring a few times they will cook done in a few minutes; or they may be cooked in deep fat the same as French fries. The time required with the fat at a temperature of 375° F. is about 2½ minutes.

When cooking "Boiling potatoes" the frozen strips or pieces should be placed in a kettle preferably with a raised false bottom, so that a little water can be put in the bottom of the kettle, but not very much up on the potatoes as they are much better if they are cooked mostly by steam. These frozen boiling potatoes will cook much quicker than fresh potatoes.

"Potatoes" are one of the largest food items in the world, and for many years many people individually, as well as many research laboratories have spent a great deal of both time and money in trying to find a satisfactory method of preserving, prepeeled prepared, ready cut potatoes for the house wife and the institutional trade without any degree of success.

Now comes this process and method after many years experimenting that, first, conditions for starch and sugar content to bring the two in balance for the most perfect results; then the method of washing with water under high pressure spray and revolving fiber brushes both working on the potato and at the same time to thoroughly scrub and clean them; then this new method of steam peeling with higher pressure of steam for a shorter length of time; then the sudden change of temperature by applying a heavy spray of ice water and at the same time as the ice water high pressure spray is applied the steamed potatoes are being rolled over and over rubbing together and coming into direct contact with the soft fiber revolving brushes, which removes all of the thin outer skin without the potatoes having been steamed into the texture of the potato (as is the case with other steam peeling methods) thereby having all of the outer portion of the potato. It is a well known fact that most of the vitamins contained in the potato are in the outer ⅜ inch.

Next the method of blanching with live steam, using a long blancher with heavy drop curtain at either end to hold the steam in the blancher at higher temperature than used by others in use; and in addition to this feature, the steam stacks at either end are equipped with steam valves to help build up the steam temperature as needed.

Then comes one of the most important portions of this preserving process, numeral 16, the cooler-dryer or cooler-dehydrator where all the outside moisture and as much as 10 to 15 percent of the original water in the potato is dried out and removed from the cut pieces of the potato, which adds greatly to the preserving ability of the process, and does not damage the quality but instead improves it.

Cut potatoes after going through the blancher 15 and cooler-dehydrator 16 contain approximately 66 to 68% water. This loss of water enhances the keeping quality as well as shortening the cooking time. (Fresh potatoes lose approximately 20% of the original moisture in cooking and gain 8 to 10% weight from cooking fat absorption). In my process, with part of the water removed, the potatoes cook in less than half the usual time, and because of the shorter time in the cooking fat, they absorb much less oil (usually reducing the oil absorption to 5 to 7%). By removing a part of the original water content, the potatoes do not cool the cooking fats as do fresh potatoes, thus causing a sealing effect over the outside of the French fries which makes them crisp and crunchy and keeps them crisp for many hours after cooking.

Then the chill section numeral 17, which through its refrigeration and circulating fans the product is cooled to a point where it is prepared to enter the freezing tunnels at a cool, even temperature, which is very advantageous in obtaining a perfect quick-freeze with best results in the finished product.

The actual freezing is by means of standard methods of quick-freezing in use at the present time, and I claim no new apparatus or method in this step of the operation.

For best results in cooking, the frozen potatoes are best removed from the frozen food storage and left at room temperature for 15-20 minutes before cooking in deep fat or frying, as this eliminates most of the outside frost.

I claim:

1. In a process for preparing and preserving white potatoes for subsequent cooking which process includes quick freezing of cut pieces at temperatures below zero degrees F., the preliminary step of treating the potatoes in the form of cut, uncooked pieces in a rapidly agitated fresh water bath thus removing excess outside starch to prevent the pieces from sticking together.

2. In a process for preparing and preserving white potatoes for subsequent cooking which process includes quick freezing of cut pieces at temperatures below zero degrees F., the preliminary steps of treating the potatoes in the form of cut, uncooked pieces in a rapidly agitated fresh water bath thus removing excess outside starch to prevent the pieces from sticking together, then applying enclosed live steam evenly to the pieces at a pressure not substantially above atmospheric pressure and at a temperature of 210-250° F., then partially dehydrating the pieces by subjecting the pieces to forced circulating air to reduce their moisture content to 10-15% less than that of freshly cut, untreated potatoes, and then chilling the potatoes to a temperature of 35°-38° F. while circulating air about the pieces to dry them.

3. A continuous process for preparing and preserving white potatoes, comprising the steps of removing the skin by subjecting the potatoes briefly to steam followed by spraying with very cold water and gentle rubbing, cutting the potatoes to cooking shapes and sizes, treating the cut pieces in a rapidly agitated fresh water bath thus removing excess outside starch to prevent the pieces from sticking together, blanching the pieces with enclosed live steam at a pressure not substantially above atmospheric pressure and at a temperature of 210-250° F. for about three minutes to kill the enzymes and stop oxidation, subjecting the pieces to air currents to surface dry the pieces and reduce their moisture content to 10-15% less than that of freshly cut, untreated potatoes, cooling the pieces to a temperature of 35°-38° F. while circulating air about the pieces to assist in drying, and quick freezing the chilled pieces at a temperature of −20° to −30° F.

HENRY M. CHASE.

REFERENCES CITED

The following references are of record in the file of this patent:

UNITED STATES PATENTS

| Number | Name | Date |
| --- | --- | --- |
| 910,374 | Hahn | Jan. 19, 1909 |
| 1,306,835 | Pennock | June 17, 1919 |
| 1,391,821 | Davies | Sept. 27, 1921 |
| 1,805,400 | Hirsch | May 12, 1931 |
| 1,871,507 | Gardner | Aug. 16, 1932 |
| 1,930,414 | Buhr | Oct. 10, 1933 |
| 1,988,319 | King | Jan. 15, 1935 |
| 2,109,694 | Goble | Mar. 1, 1938 |
| 2,166,278 | Alderfer | July 18, 1939 |
| 2,278,472 | Musher | Apr. 7, 1942 |
| 2,355,798 | Guthier | Aug. 15, 1944 |
| 2,374,587 | De Werth | Apr. 24, 1945 |
| 2,401,392 | Ware et al. | June 4, 1946 |
| 2,477,605 | Howard et al. | Aug. 2, 1949 |
| 2,523,552 | Birdseye | Sept. 26, 1950 |